United States Patent [19]

Epstein et al.

[11] Patent Number: 5,191,502
[45] Date of Patent: Mar. 2, 1993

[54] UNITARY PANEL FOR CONNECTING A LOAD TO A POWER SOURCE IN A MANNER WHICH CONTROLS VOLTAGE SURGES AND TRANSIENTS AND ACCOMMODATES THE NEEDS OF NON-LINEAR LOADS

[76] Inventors: Barry M. Epstein, 7523 Cliffbrook, Dallas, Tex. 75240; Mark A. Arnspiger, 8605 Westfield, Dallas, Tex. 75243; Edmond E. Dumas, Jr., 7815 McCallum No. 2202, Dallas, Tex. 75252

[21] Appl. No.: 655,853
[22] Filed: Feb. 15, 1991
[51] Int. Cl.⁵ ............................................. H02H 9/04
[52] U.S. Cl. ..................................... 361/111; 361/56; 361/118
[58] Field of Search ............... 361/111, 118, 119, 361, 361/56, 91, 127

[56] References Cited
U.S. PATENT DOCUMENTS 4,642,733  2/1987  Schacht .............................. 361/118
4,675,772  6/1987  Epstein .............................. 361/111

Primary Examiner—A. D. Pellinen
Assistant Examiner—S. Jackson
Attorney, Agent, or Firm—Terry M. Gernstein

[57] ABSTRACT

A panel, such as used to connect a building wiring system to a source of utility power, includes a voltage surge and transient protector network mounted directly thereon to be unitary therewith. The panel can be used as a stand alone panel, or in combination with other subpanels in an overall system. Each of the subpanels can include its own protector network, or can include further elements of the protector network partially included on the main panel whereby all of the panels in an overall system co-operate to form the voltage surge and transient protection network. The protection networks disclosed in U.S. Pat. Nos. 4,675,772 and 4,835,650 are integrated into panels to form protection networks. Enhancements for high neutral currents and isolated ground buses are included with the panel and protective elements in various forms of the invention.

22 Claims, 5 Drawing Sheets

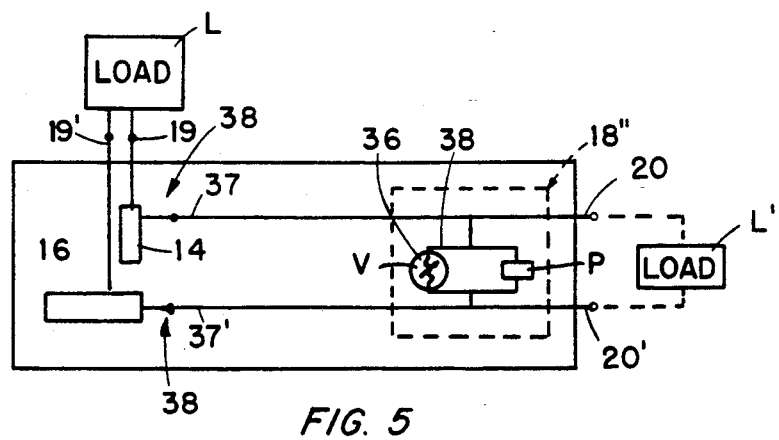
FIG. 5
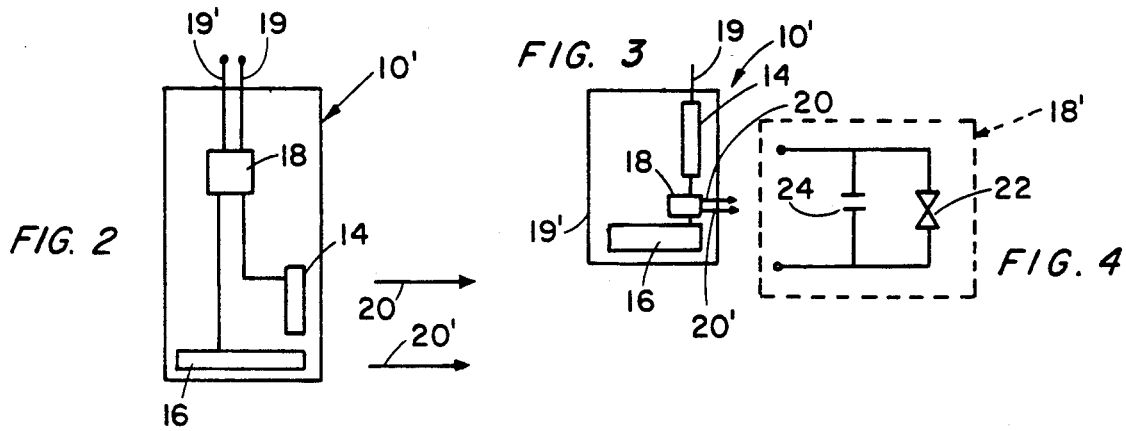
FIG. 2
FIG. 3
FIG. 4
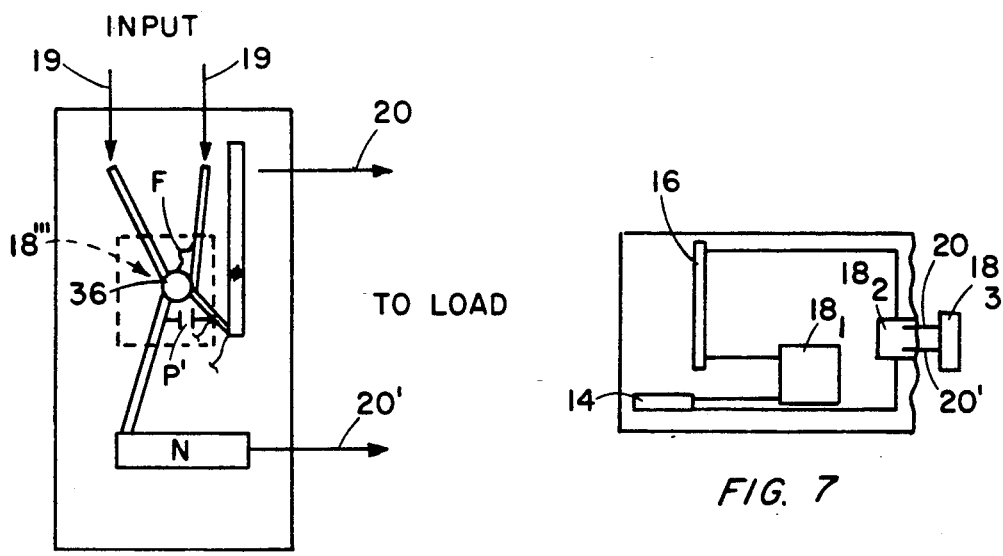
FIG. 6
FIG. 7

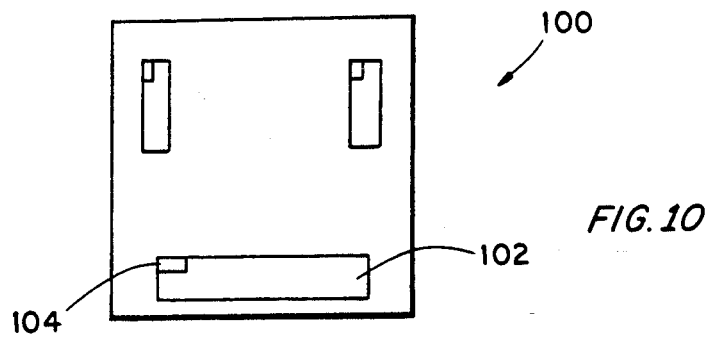
FIG. 10
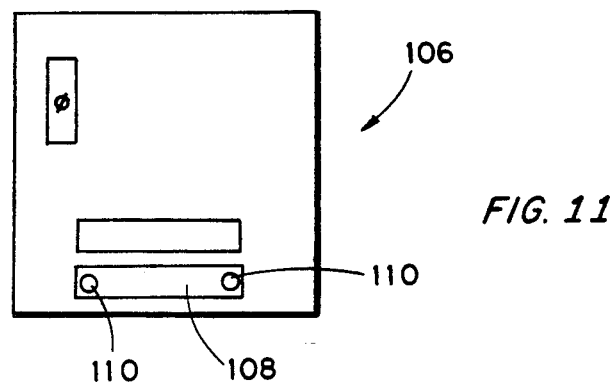
FIG. 11
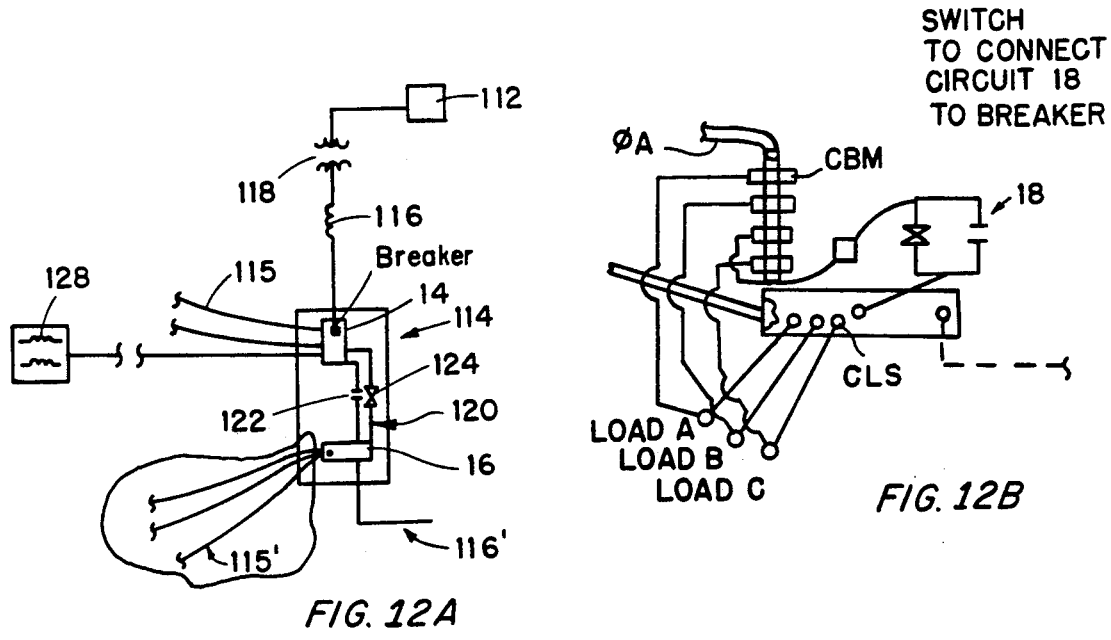
FIG. 12A
FIG. 12B

1:Z

Y = Z$_X$
Y = Z$_X$

UNITARY PANEL FOR CONNECTING A LOAD TO A POWER SOURCE IN A MANNER WHICH CONTROLS VOLTAGE SURGES AND TRANSIENTS AND ACCOMMODATES THE NEEDS OF NON-LINEAR LOADS

TECHNICAL FIELD OF THE INVENTION

The present invention relates to the general art of building installations which connect electronic equipment to a source of power, and to the particular field of panels used to connect a building and/or equipment to utility power.

BACKGROUND OF THE INVENTION

Communications equipment, computers, work stations, automated test and production equipment, military targeting systems, home stereo systems, televisions, and other electronic devices as well as electrical loads using integrated circuits, solid state components, switching power supplies, semiconductor networks and the like, are increasingly characterized by small electrical contacts and miniature components which are very vulnerable to interference or damage due to interference from electrical disturbances carried by power line conductors connected thereto. Unpredictable variations in power line conductor voltage changes the operating range and can severely damage or destroy such devices. These devices and related process problems are very expensive to repair or to replace and therefore require cost-effective protection from transients and surges associated with the power.

High frequency disturbances can cause unreliable operation resulting in erroneous output. This "bad" output can be in the form of poorly machined metal to something as severe as unrecognizable transmitted information in various applications, including military applications.

Accordingly, the electrical art has included several devices for protecting sensitive communications and power installations, as well as other types of a-c loads, from damaging power surges and transients.

These devices are generally added on to a power distribution system. Examples of such "add on" devices are disclosed in patents such as U.S. Pat. No. 4,675,772 (the disclosure of which is incorporated herein by reference) and U.S. Pat. No. 4,835,650 (the disclosure of which s incorporated herein by reference). These devices are added to an already-existing wiring system by being connected to a main breaker panel which connects building wiring to utility power wiring, or by being connected to a subpanel located at or near a point of use, such as at a floor or other such building area.

While extremely effective, such add-on devices have the particular drawback of being subject to vagaries associated with installation. For example, while most electricians are highly competent, the inventors have found some installations to be out of the range set for specifications for proper installation, and some installations where the wiring was actually incorrectly connected. Such out of specification and erroneous wiring installations can vitiate, if not totally defeat, the overall results sought by the installation of such protection equipment.

Still further, the inventors have found that many electricians use long wires, which can be small in diameter, to connect the protection equipment to the various panels. Such wiring may be required due to the location and design of a particular panel; however, the inventors have found that such wiring, itself, can introduce errors into the equipment, and can defeat the overall results sought by the use of such protection equipment.

In addition, the inventors have found many cases where an electrician has not allowed for high neutral currents generated by multiple switching power supply loads or adequate provision for proper (isolated) grounding eventually traceable to a single system ground point which may even involve multiple panels.

Thus, no matter how proficient and competent the electrician, the connection of such protection equipment is often carried out in a manner which is not totally desirable for maximum effectiveness, and can vitiate the performance of such equipment.

Because light bulb and motor-type loads have neutral currents which are phasors that tend to sum to zero, many prior three-phase panels use a neutral bus which is sized for the same or smaller amperage as the phase supply connectors. This permits the neutral to be smaller and less expensive. However, computer loads (i.e., switching power supplies) are non-linear. They do not sum to zero on the neutral, but actually can sum to $3\frac{1}{2}$ larger than the phase currents. Still further, many present panels have small lugs which necessitate the use of small wiring. Such small wiring may be a source of overheating, electrical noise or voltage drops. Therefore, many existing circuit breaker panels may prove to be inadequate to meet the needs of a modern multi-story building. As used herein, the term "panel" refers to well-known circuit breaker panels used to distribute electrical power to a multiplicity of electrical circuits or loads. These panels typically include buses (usually a flat metal structure) for each phase of supply power, a neutral or "return" bus and possible ground buses. Circuit breakers for each branch circuit to be distributed usually clamp or bolt onto the phase buses as a convenient means of physical attachment, electrical access and electrical protection.

Therefore, there is a need for a panel that can be used to connect electronic equipment to a source of power in a manner which permits efficient, effective and accurate connection of power surge protecting and filtering circuits into a building wiring system, and which can have the protection circuit and other performance enhancing elements installed at a factory.

OBJECTS OF THE INVENTION

It is a main object of the present invention to provide a panel that can be used to connect electronic equipment to a source of power in a manner which permits efficient, effective and accurate connection of power surge protecting and noise filtering circuits into a building wiring system.

It is another object of the present invention to provide a panel that can be used to connect electronic equipment to a source of power in a manner which permits efficient, effective and accurate connection of power surge protecting circuits into a building wiring system and which can have the protection circuit and a filtering circuit installed at a factory so that the wiring associated with the connection of the protection network to the building wiring will be carried out exactly according to specification and will be effected in an accurate manner that does not introduce errors into the system or vitiate the performance of the protection network.

It is another object of the present invention to provide a panel that can be used to connect electronic equipment to a source of power in a manner which permits efficient, effective and accurate connection of power surge protecting circuits into a building wiring system and which is also capable of handling high currents without overheating or developing noise or experiencing voltage drops.

It is another object of the present invention to provide a panel that can be used to connect electronic equipment to a source of power in a manner which permits efficient, effective and accurate connection of power surge protecting circuits into a building wiring system and which is also capable of handling high currents without overheating or developing additional noise or experiencing voltage drops and which also facilitates the use of oversized neutral wiring all the way back to a source transformer.

It is another object of the present invention to provide a panel that can be used to connect electronic equipment to a source of power in a manner which permits efficient, effective and accurate connection of power surge protecting circuits into a building wiring system and which is also capable of handling high currents without overheating or developing noise or experiencing voltage drops and which can be installed with little chance of error.

It is another object of the present invention to provide a panel that can be used to connect electronic equipment to a source of power in a manner that provides efficient noise filtering capabilities.

SUMMARY OF THE INVENTION

These, and other, objects are achieved by a breaker-type panel which has protection circuitry unitarily installed therein. The circuitry can be installed at the factory and thus can be subject to strict quality control procedures. The protection circuitry is directed to voltage surge and transient protection.

The circuitry can be, but need not be, located on a special module that is mounted on the panel plate, so that changes can be made in the field by simply replacing one plate with another. However, both assemblies are supplied to the installer so that the circuitry on the assembly is within specifications. Out of spec wiring and erroneous connections will be avoided so that the surge and transient protection circuitry will function in its intended manner.

Furthermore, the neutral bus on the panel of the present invention is oversized with respect to prior neutral buses. For example, in a 225 amp panel, most prior panels would include a neutral bus which is approximately one inch wide. However, the panel of the present invention has a 400 amp neutral bus which is four inches wide. Better quality conductors can also be used. This permits the panel to handle high currents without overheating or developing noise or experiencing a voltage drop. The panel of the present invention also includes oversized lugs so oversized neutral wiring can be easily used all the way back to the source of power.

The panel of the present invention also includes an isolated ground bus. The ground bus of the present invention is the same size or larger than the phase bus and has an input terminal at least as large as the terminal of the phase bus. This large ground bus in addition to the other elements of the panel, provides the panel with the capability of providing low noise operation. One form of the panel includes one isolated ground bus connection point per output branch circuit.

BRIEF DESCRIPTION OF THE DRAWING FIGURES

FIG. 2 illustrates a panel having a protector network integral therewith and positioned between input elements and the panel buses.

FIG. 3 illustrates a panel having a protector network integral therewith and positioned between a phase bus and a neutral bus.

FIG. 4 illustrates one form of protector network.

FIG. 5 illustrates a panel having a special protector network integral therewith as disclosed in U.S. Pat. No. 4,835,650 positioned between each bus and output elements.

FIG. 6 illustrates a protector network integral therewith and that is similar to the network disclosed in U.S. Pat. No. 4,835,650 positioned between input elements and the buses of the panel.

FIG. 7 illustrates a panel having one protector network integral therewith and positioned between the buses of the panel and a further network positioned between the buses and an output element, with an indication of further protector networks in an overall system.

Figure 8:
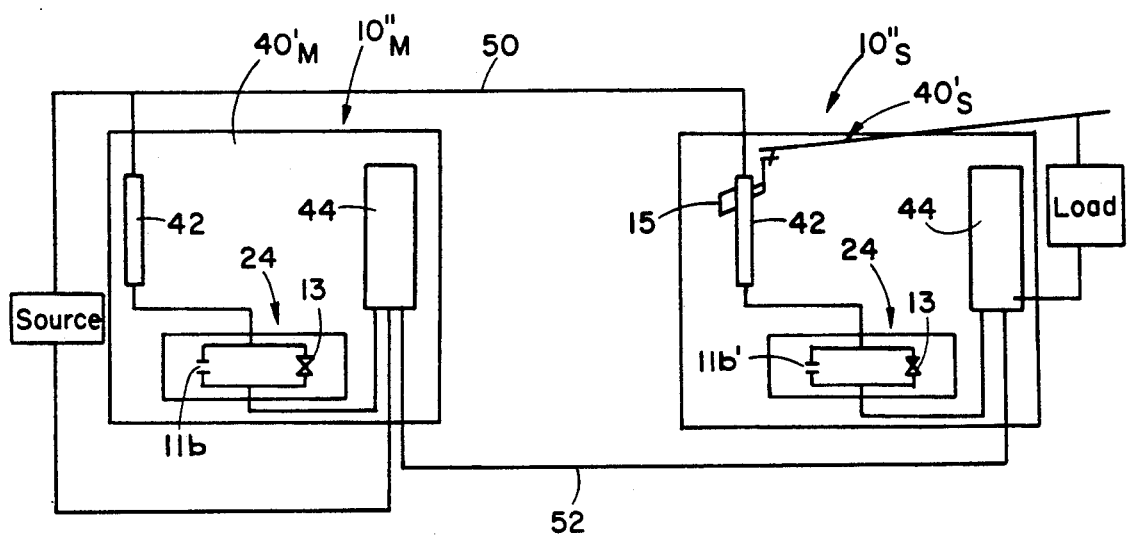

FIG. 8 illustrates a system which includes a main panel and a subpanel, each of which includes a protector network such as indicated in FIG. 4 integral therewith.

Figure 9:
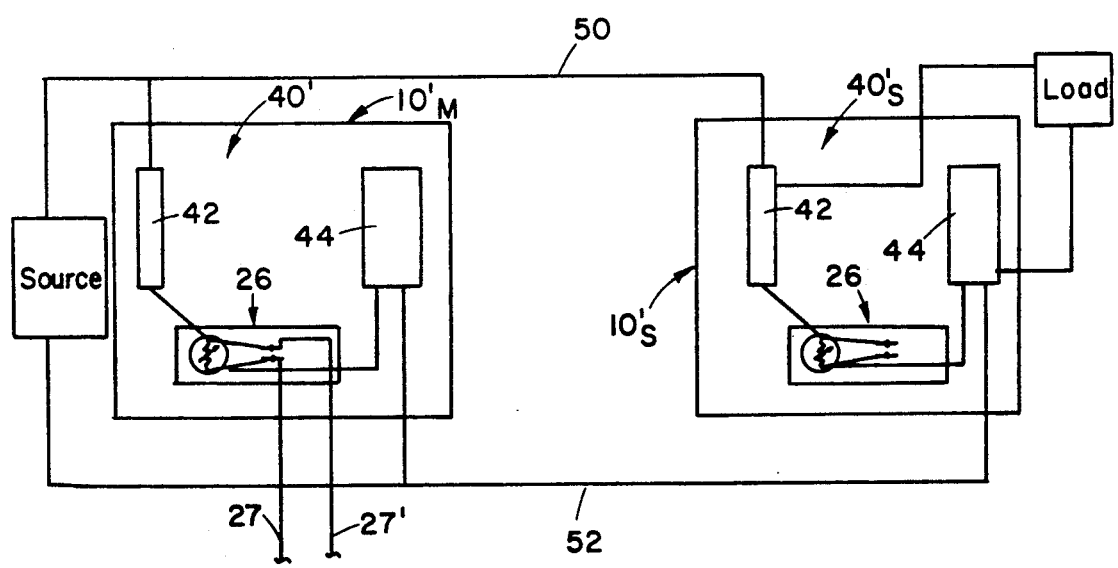

FIG. 9 illustrates a system which includes a main panel and a subpanel, each of which includes a protector network such as indicated in FIGS. 5 and 6 integral therewith.

FIG. 10 illustrates a panel having an oversized neutral bus and a large main lug.

FIG. 11 illustrates a panel having an isolated ground bus.

FIG. 12A illustrates a main panel connected to a plurality of subpanels and having a surge protection circuit integral therewith.

FIG. 12B illustrates another form of a main panel connected to a plurality of subpanels and having a surge protection circuit thereon.

Figure 13A:
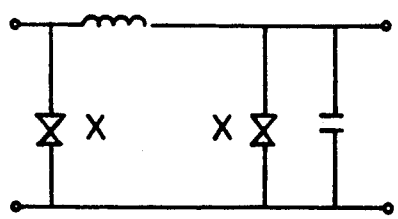

FIG. 13A illustrates a portion of a surge protection circuit as disclosed in the referenced U.S. Pat. No. 4,675,772.

Figure 13B:
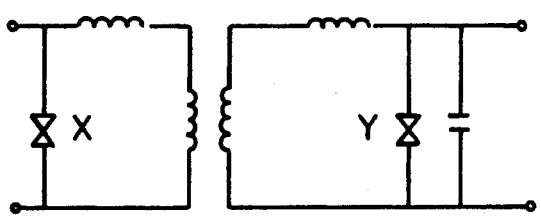

FIG. 13B illustrates a protection circuit which ratios the values of the protection elements on one side of a transformer to the values of protection elements on another side of the transformer according to the winding ratio of the transformer.

Figure 14:
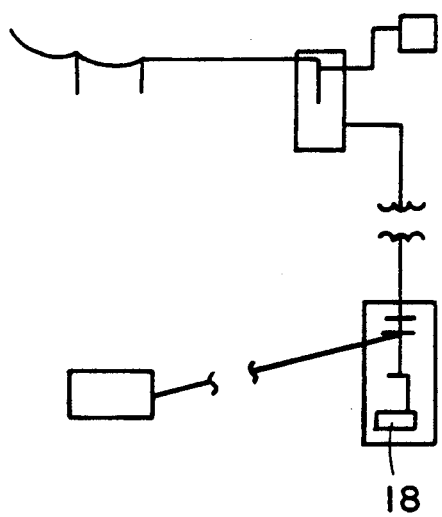

FIG. 14 illustrates a main panel connected to a source of utility power and to other panels in a multi-panel building, with all panels and subpanels having protector networks integral therewith.

Figure 15:
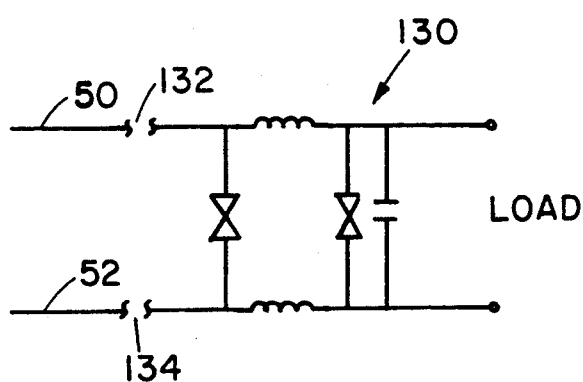

FIG. 15 illustrates a circuit similar to the circuits shown in the referenced patent.

DETAILED DESCRIPTION OF THE PREFERRED EMBODIMENT OF THE INVENTION

Figure 1:
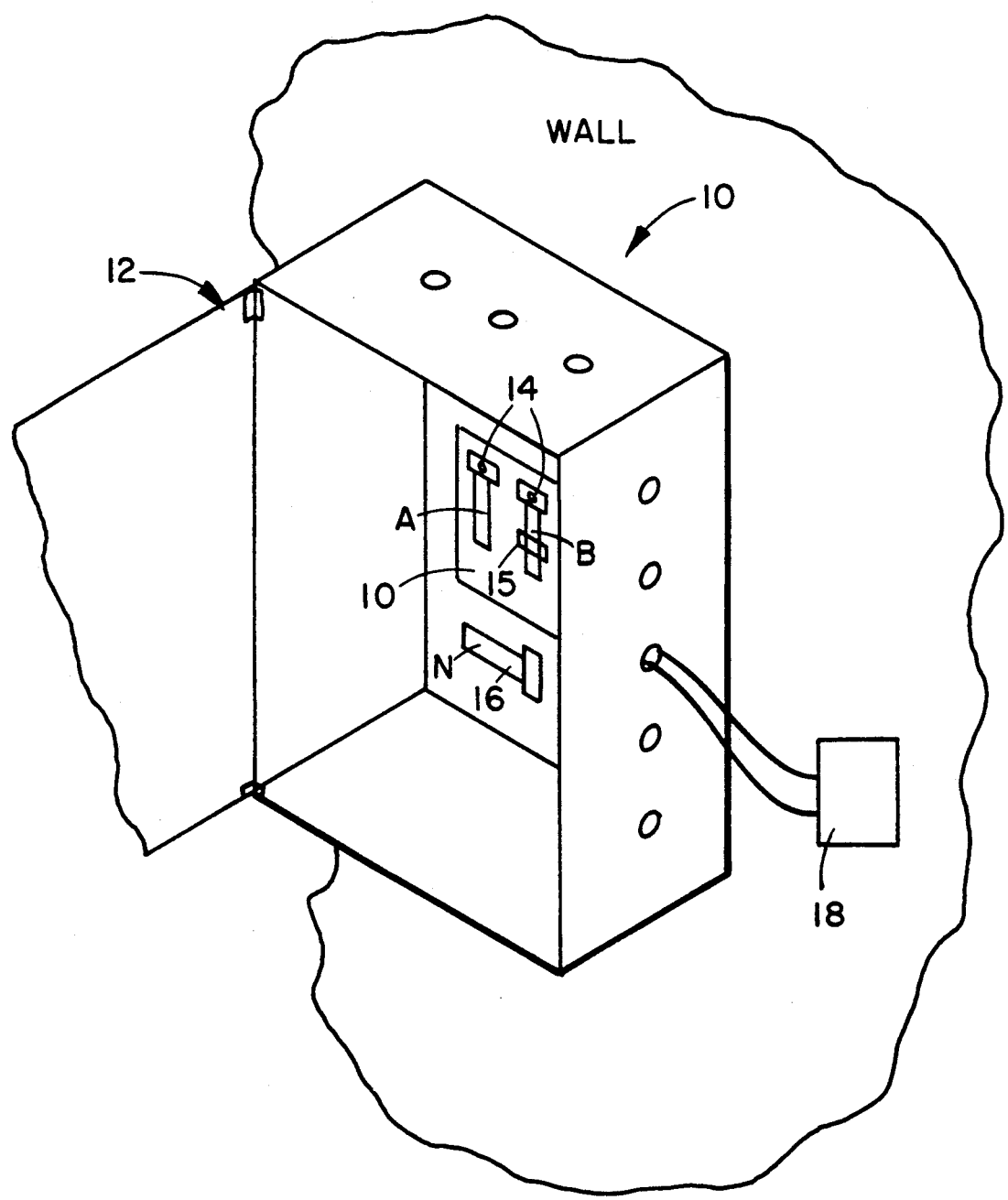
FIG. 1 illustrates a prior art installation of power surge and transient protection equipment to a panel, such as a main breaker panel.

Shown in FIG. 1 is a circuit breaker panel 10 that is similar to the main breaker panel or to subpanels presently used in a building to connect the wiring of that building to utility power or to connect subareas of the building to the main building wiring. The panel includes a housing 12 that is mounted on a wall or the like, and has phase buses 14 mounted thereon with a neutral bus 16 also being contained in the housing 10. A breaker 15 is also included.

As is presently the case in many situations, a surge and transient protection network 18 can be connected to the housing and panel by line conductors 20 and 22. The overall network 18 includes various elements, as will be discussed below.

As discussed above, the connection of the network 18 to the panel 10 has been found by the inventors to be a source of errors which can vitiate the performance of the network 18 with respect to the system to which it is connected. Conventional panels also are prone to installation errors as discussed above, and may not properly address the needs of modern electronic equipment. For example, non-linear power supplies and sensitive equipment create the need for oversized (as compared to a phase conductor) neutral capacity and/or isolated ground buses. Hence, the panel embodying the present invention includes an isolated ground bus and an oversized neutral bus and connection lugs. Specifically, the neutral bus is much larger or heavier in current carrying capacity than neutral buses presently used in the art. For example, if a present circuit breaker panel uses a 225 amp one inch neutral bus, the neutral bus of present invention could be a 400 amp four (as measured between the two side edges) inch bus. The bus could be copper rather than aluminum. Still further, lugs attach the neutral bus to suitable elements. Such lugs ar also fifty percent to two hundred percent larger than the lugs used in presently available panels. These lugs can be larger than one inch in diameter. Multiple lugs may also be provided to facilitate interconnection of multiple panels or loads. Power from a power source is connected to the buses by line conductors, and is supplied to a load by line conductors.

The present invention is embodied in a panel that is unitary in nature and which unitarily includes the surge and transient protection network therein with the elements of the protection network being mounted directly on a base of the panel.

For example, the panel 10' shown in FIG. 2 has a protection network 18 interposed between input elements 19 and 19' and the buses 14 and 16 to which output elements 20 and 20' are connected. Another form of the panel is shown at 10" in FIG. 3 in which the protector network 18 is positioned between the buses 14 and 16, with the input elements 19 and 19' being connected to the buses 14 and 16 respectively. The output elements 20 and 20' are connected to the protector network 18.

One form of the protector network is illustrated in FIG. 4 as network 18' which includes a surge suppressor 22 and a capacitor 24. Another form of the protector network is illustrated in FIG. 5 as network 18" which includes an MOV 36 connected directly to leads 37 and 37' at terminals 38. The network 18" is shown as being interposed between buses 14 and 16 and input elements 19 and 19' and output elements 20 and 20'. The network 18" is fully disclosed in U.S. Pat. No. 4,835,650, the disclosure of which is fully incorporated herein by reference. Loads L and L' are located on the input and output sides respectively.

A further form of the panel mounted protection network is illustrated in FIG. 6 as network 18'''. The network 18''' is similar to the network 18" shown in FIG. 5 with element P in FIG. 5 being a capacitor P' in FIG. 6, and a fuse F is also included.

As shown in FIG. 7, another form of the invention includes a single panel having a plurality of protector networks $18_1$ and $18_2$ integral therewith. Network $18_1$ is interposed between the buses 14 and 16, and network $18_2$ is interposed between the buses and output elements 20 and 20'. Yet a further network $18_3$ is connected to the output elements, with further elements being connected thereto. The system indicated in FIG. 7 thus can be used in a multipanel and multi-element system, such as is disclosed in co-pending patent application Ser. No. 07/519,180, filed on May 4, 1990, the disclosure of which is fully incorporated herein by reference.

The system shown in FIG. 8 includes a main panel $10''_M$ such as disclosed above with regard to FIG. 4 cooperating with one or more subpanels, such as subpanel $10''_S$. Each of the panels is unitary and includes a phase bus 42, a neutral bus 44, and a surge and transient protection network 24 unitarily integrated thereon by having the circuit elements 11b and 11c (on the main panel) and 11b' and 13 (on a subpanel) mounted directly onto the bases $40'_M$ and $40'_S$. By including the element 11c on the main panel and the element 13 on a subpanel, the system shown in FIG. 8 has part of the overall protection network on each panel, and all of the panels co-operate with each other to define the overall protection network. Building wiring, such as leads 50 and 52 connect the various panels together.

FIG. 9 illustrates a set up similar to that shown in FIG. 8, except that the protection networks 26 are used in place of the protection networks 24 shown in FIG. 8. The protection networks 26 are similar to the network disclosed in the incorporated U.S. Pat. No. 4,835,650, and discussed above with regard to FIGS. 5 and 6. It is also noted that further panels can be connected to the protection networks 26 via leads 27 and 27'.

Shown in FIG. 10 is a panel 100 having an oversized neutral bus 102 with a large main lug 104. As discussed above, the oversized neutral buss is 75% to 100% larger than presently available busses from an amperage standpoint and as much as four times as wide. The lug 104 is also as much as two to four times as large as presently available lugs so very large neutral wires can be used.

As shown in FIG. 11, one form of the panel, panel 106, includes a ground bus 108 which includes insulation 110 so that ground bus is isolated.

FIG. 12A illustrates a set up in which a main circuit breaker panel 112 with transient protection and/or filtering such as an MP panel (manufactured by Current Technology, Inc, of Richardson, Tex.) or the like, is connected to a subpanel 114, such as an MPA panel (manufactured by Current Technology, Inc, of Richardson, Tex.) or the like, via a lead line having an inductance 116, and in which a transformer 118 can be inserted, and a similar return neutral line 116'. The subpanel 114 contains busses 14 and 16 and is connected to a multiplicity of elements, such as PC's or the like via lines, such as lines 115 and return or neutral lines 116'. As shown in FIG. 12A, the FIG. 12 set up can include circuit breaker means CBM and clamps CLS. However, some elements, such as PC's, have a tendency to "talk" to each other via the subpanel thereby creating noise on the lines. The panel 114 prevents such noise by including a system 120 having a capacitor 122 and a voltage suppressor 124. In the configuration shown in FIGS. 12 and 12A, if a spike appears on the utility line going to the main panel 112, such spike will be reduced by at least two suppressor steps. For example, a 1000 volt spike is reduced to a 400 volt spike by the MP unit 112, and the MPA subpanel 114 reduces it to 30 volts. If further suppressor units, such as unit 128, are included, further protection can be provided. The further units 128 can be PC10 units (manufactured by Current Technology, Inc, of Richardson, Tex.) or the like.

FIG. 13A represents the wiring between two sets of suppressor-equipped panels as described above. Both suppressors may be the same value, x, as explained in the incorporated patent.

If a transformer is used, the suppressor elements on one side of the transformer are scaled according to the transformer winding ratio. This is illustrated in FIG. 13B in which the transformer has a winding ratio of 1:Z and the elements on one side of the transformer are scaled to be equal to or greater than Z times the values of corresponding elements on the other side of the transformer.

FIG. 14 illustrates the set up mentioned above in regard to FIGS. 12A and 12B.

Shown in FIG. 15 is a network 130 in which a unit such as a PC10 is plugged into lines 50 and 52 by plug elements 132 and 134. The PC10 unit has two voltage suppressor elements separated by a line having an inductance, and a capacitor element is also included.

The set ups illustrated in FIGS. 5, 7-9, 12A, 12B and 14 can be part of an overall building wiring system such as is discussed in the referenced patent application.

It is understood that while certain forms of the present invention have been illustrated and described herein, it is not to be limited to the specific forms or arrangements of parts described and shown.

We claim:

1. A distribution panel for use in connecting a load to a source of power comprising:
   A) a base;
   B) a phase bus mounted directly on said base;
   C) a neutral bus mounted directly on said base, said neutral bus being larger in current carrying capability than said phase bus;
   D) a voltage surge and transient protector network mounted directly on said base to be unitary and integral with said base, said voltage surge and transient protector network including a capacitor and a voltage suppressor element; and
   E) a plurality of lugs electrically connected to said neutral bus, said lugs being sized in accordance with the larger current carrying capacity of said neutral bus.

2. The panel defined in claim 1 wherein said protector network includes
   a filter capacitor mounted directly on said base, and
   a voltage surge protector element mounted directly on said base.

3. A system where power is supplied to a load from a voltage source comprising:
   A) a unitary main distribution panel connected to a voltage source and including
      a base,
      a phase bus mounted directly on said base,
      a neutral bus mounted directly on said base, said neutral bus being larger in ampacity than said phase bus,
      a first voltage surge and transient suppressor mounted directly on said base to be unitary with said base and connected across supply lines from said voltage source, said first voltage surge and transient suppressor including a capacitor and a voltage suppressor element, and
      a plurality of lugs electrically connected to said neutral bus, said lugs being sized in accordance with the larger current carrying capacity of said neutral bus
   B) a distribution subpanel including
      a base,
      a phase bus mounted directly on said subpanel base,
      a neutral bus mounted directly on said subpanel base, said neutral bus being larger in ampacity than said phase bus,
      a second voltage surge and transient suppressor mounted directly on said subpanel base to be integral and unitary therewith, said second suppressor being connected across said supply lines, the minimum breakdown voltage of said first suppressor being that voltage, above which would damage the load, whereby the breakdown of the second voltage suppressor results in the voltage across the load being below that which would damage the load and protecting said load from power surges and voltage transients occurring at said source side, said second voltage surge and transient suppressor including a capacitor and a voltage suppressor element, and
      a plurality of lugs electrically connected to said neutral bus, said lugs being sized in accordance with the larger current carrying capacity of the neutral bus on said subpanel and
      a filter means disposed between said first and second voltage surge and transient suppressors for filtering the power to said load, said second voltage surge and transient suppressor being effective to protect the load from conditions occurring at the load side; and
   C) line conductor means connecting said main and subpanels together.

4. The system defined in claim 3 wherein the breakdown voltage of said second voltage suppressor is that voltage, above which would damage the load.

5. The system defined in claim 4 wherein said filter means further includes a a capacitor assembly mounted directly on said main panel and a second capacitor mounted directly on said subpanel.

6. The system defined in claim 5 further including an isolated ground bus.

7. The system defined in claim 6 wherein said capacitor assembly is designed to stop high frequency noise between loads.

8. The system defined in claim 7 further including a transformer having a winding ratio.

9. The system defined in claim 8 further including first suppressor elements on one side of said transformer and second suppressor elements on another side of said transformer, with said second suppressor elements being scaled to have values equal to or greater than the values of associated ones of said first suppressor elements as scaled by the transformer ratio.

10. A system where a-c power is supplied to a load from an a-c voltage source comprising:
   A) a unitary main distribution panel connected to an a-c voltage source and including
      a base,
      a phase bus mounted directly on said base, a neutral bus mounted directly on said base, said neutral bus being larger than said phase bus in current carrying capacity, a first voltage suppressor mounted directly on said base to be unitary with said base and connected across supply lines from said voltage source, a first capacitor mounted directly on said base and connected across said supply lines, and lugs connected to said neutral bus that are sized in accordance with the larger current carrying capacity of said neutral bus, B) a distribution subpanel including a base, a phase bus mounted directly on said subpanel base, a neutral bus mounted directly on said subpanel base, said neutral bus being larger in current carrying capacity than said phase bus, a second voltage suppressor mounted directly on said subpanel base to be integral and unitary therewith, said second suppressor being connected across said supply lines, the minimum breakdown voltage of said first suppressor being that voltage, above which would damage the load, whereby the breakdown of the second voltage suppressor results in the voltage across the load being below that which would damage the load and protecting said load from power surges and voltage transients occurring at said source side, a second capacitor mounted directly on said base and connected to said supply line, and a filter means disposed between said first and second voltage suppressors for filtering the power to said load, said second voltage suppressors being effective to protect the load from conditions occurring at the load side; and C) line conductor means connecting said main and subpanels together.

11. The panel defined in claim 1 wherein said voltage surge and transient protection network includes a voltage suppressor.

12. The panel defined in claim I further including a neutral bus mounted directly on said base.

13. The panel defined in claim 3 wherein the breakdown voltage of said second voltage suppressor is equal to the breakdown voltage of said first and second voltage suppressor.

14. The panel defined in claim 9 wherein said second suppressor element is scaled to have a value scaled to the first suppressor element by the transformer winding ratio.

15. The panel defined in claim 12 further including a circuit breaker means for connecting loads with the phase bus.

16. The panel defined in claim 15 further including a further circuit breaker means for connecting loads with the neutral bus.

17. The panel defined in claim 4 wherein said filter means includes a first filter element mounted directly on said main panel and a second filter element mounted directly on said subpanel.

18. A system where power is supplied to a load from a voltage source comprising:

A) unitary main distribution panel connected to a voltage source and including a base, a phase bus mounted directly on said base, a neutral bus mounted directly on said base, said neutral bus being larger in ampacity than said phase bus, a first voltage surge and transient suppressor mounted directly on said base to be unitary with said base and connected across supply lines from said voltage source, said first voltage surge and transient suppressor including a capacitor and a voltage suppressor element, and a plurality of lugs electrically connected to said neutral bus, said lugs being sized in accordance with the larger current carrying capacity of said neutral bus;

B) a distribution subpanel including a base, a phase bus mounted directly on said subpanel base, a neutral bus mounted directly on said subpanel base, said neutral bus being larger in ampacity than said phase bus, a second voltage surge and transient suppressor mounted directly on said subpanel base to be integral and unitary therewith, said second suppressor being connected across said supply lines, the minimum breakdown voltage of said first suppressor being that voltage, above which would damage the load, whereby the breakdown of the second voltage suppressor results in the voltage across the load being below that which would damage the load and protecting said load from power surges and voltage transients occurring at said source side, said second voltage surge and transient suppressor including a capacitor and a voltage suppressor element, and a plurality of lugs electrically connected to said neutral bus, said lugs being sized in accordance with the larger current carrying capacity of the neutral bus on said subpanel; and C) line conductor means connecting said main and subpanels together.

19. A system where a-c power is supplied to a load from an a-c voltage source comprising:

A) a unitary main panel connected to an a-c voltage source and including a base, a phase bus mounted directly on said base, a neutral bus mounted directly on said base, said neutral bus being larger than said phase bus in current carrying capacity, a first voltage suppressor mounted directly on said base to be unitary with said base and connected across supply lines from said voltage source, a first capacitor mounted directly on said base and connected across said supply lines, and oversized lugs connected to said neutral bus, said lugs being sized in accordance with a larger current carrying capacity of said neutral bus;

B) a subpanel including a base, a phase bus mounted directly on said subpanel base, a neutral bus mounted directly on said subpanel base, said neutral bus being larger in current carrying capacity than said phase bus, a second voltage suppressor mounted directly on said subpanel base to be integral and unitary therewith, said second suppressor being connected across said supply lines, the minimum breakdown voltage of said first suppressor being that voltage, above which would damage the load, whereby the breakdown of the second voltage suppressor results in the voltage across the load being below that which would damage the load and protecting said load from power surges and voltage transients occurring at said source side, a second capacitor mounted directly on said base and connected to said supply line, and C) line conductor means connecting said main and subpanels together.

20. The distribution panel defined in claim 1 wherein the lugs connected to said neutral bus are larger than any lugs connected to said phase bus.

21. The distribution panel defined in claim 3 wherein the lugs connected to said neutral bus are larger than any lugs connected to said phase bus.

22. The distribution panel defined in claim 12 wherein the lugs connected to said neutral bus are larger than any lugs connected to said phase bus.

* * * * *